(12) United States Patent  (10) Patent No.: US 9,436,591 B1
McCloskey et al.  (45) Date of Patent: Sep. 6, 2016

(54) OUT-OF-BAND FILE TRANSFERS BETWEEN A HOST AND VIRTUAL TAPE SERVER

(71) Applicant: EMC Corporation, Hopkinton, MA (US)

(72) Inventors: Larry W. McCloskey, Burlington, MA (US); Karyn M. Kelley, Peabody, MA (US)

(73) Assignee: EMC Corporation, Hopkinton, MA (US)

( * ) Notice: Subject to any disclaimer, the term of this patent is extended or adjusted under 35 U.S.C. 154(b) by 82 days.

(21) Appl. No.: 14/041,314

(22) Filed: Sep. 30, 2013

(51) Int. Cl.
  *G06F 3/00* (2006.01)
  *G06F 12/00* (2006.01)
  *G06F 3/06* (2006.01)

(52) U.S. Cl.
  CPC ............. *G06F 12/00* (2013.01); *G06F 3/0604* (2013.01); *G06F 3/0655* (2013.01); *G06F 3/0682* (2013.01)

(58) Field of Classification Search
  None
  See application file for complete search history.

(56) References Cited

U.S. PATENT DOCUMENTS

| | | | |
|---|---|---|---|
| 7,200,546 B1* | 4/2007 | Nourmohamadian | G06F 3/0607 360/49 |
| 7,961,415 B1* | 6/2011 | Feller | .............................. 360/39 |
| 2004/0153614 A1 | 8/2004 | Bitner | |
| 2005/0049849 A1* | 3/2005 | Re | .......................... G06F 3/0605 703/26 |
| 2005/0060704 A1 | 3/2005 | Bulson | |
| 2010/0057790 A1 | 3/2010 | Johnson | |
| 2010/0180074 A1* | 7/2010 | Slater et al. | ................... 711/111 |
| 2010/0186018 A1 | 7/2010 | Bell | |
| 2015/0074677 A1 | 3/2015 | Pream | |

OTHER PUBLICATIONS

EMC Disk Library for mainframe User Guide for DLm8000; 2013; EMC Corporation; Version 3.4.1; pp. 1-152.*
Non-Final Office Action dated Jan. 12, 2016 for U.S. Appl. No. 14/041,456.
Batch Processing Guide'. SLAG Manual [online]. Dec. 7, 2008 [retrieved Dec. 31, 2015]. Retrieved from the Internet: <U RL:https :/ /web.arch ive.org/web/200812071 93508/http:/ /slac.stanford. edu/B FROOT /www/doc/workbook!batch/batch. htm 1>.
Final Office Action dated Jun. 6, 2016 for U.S. Appl. No. 14/041,456.
'Batch Processing Guide'. SLAG Manual [online]. Dec. 7, 2008 [retrieved Dec. 31, 2015]. Retrieved from the Internet: <URL: https://web.archive.org/web/20081207193508/http:/ /slac.stanford. edu/BFroot/www/doc/workbook!batch/batch.htm 1>.

* cited by examiner

*Primary Examiner* — Idriss N Alrobaye
*Assistant Examiner* — Richard B Franklin
(74) *Attorney, Agent, or Firm* — Hamilton, Brook, Smith & Reynolds, P.C.

(57) ABSTRACT

In an embodiment, a method can include sending an I/O request from a mainframe to a virtual tape server. The method can further include reading a non-virtual tape file from the virtual tape server to the mainframe over a virtual tape protocol if the I/O request is a read request. The method can further include writing a non-virtual tape file from the mainframe to the virtual tape server over the virtual tape protocol if the I/O request is a write request.

24 Claims, 5 Drawing Sheets

OUT-OF-BAND FILE TRANSFERS BETWEEN A HOST AND VIRTUAL TAPE SERVER

BACKGROUND

A virtual tape server can include multiple directories in which virtual tapes are mounted. Directories, and the virtual tapes mounted on the directories, can be accessed by systems coupled with storage systems. A mainframe can be coupled with an input/output controller which communicates with the virtual tape server.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
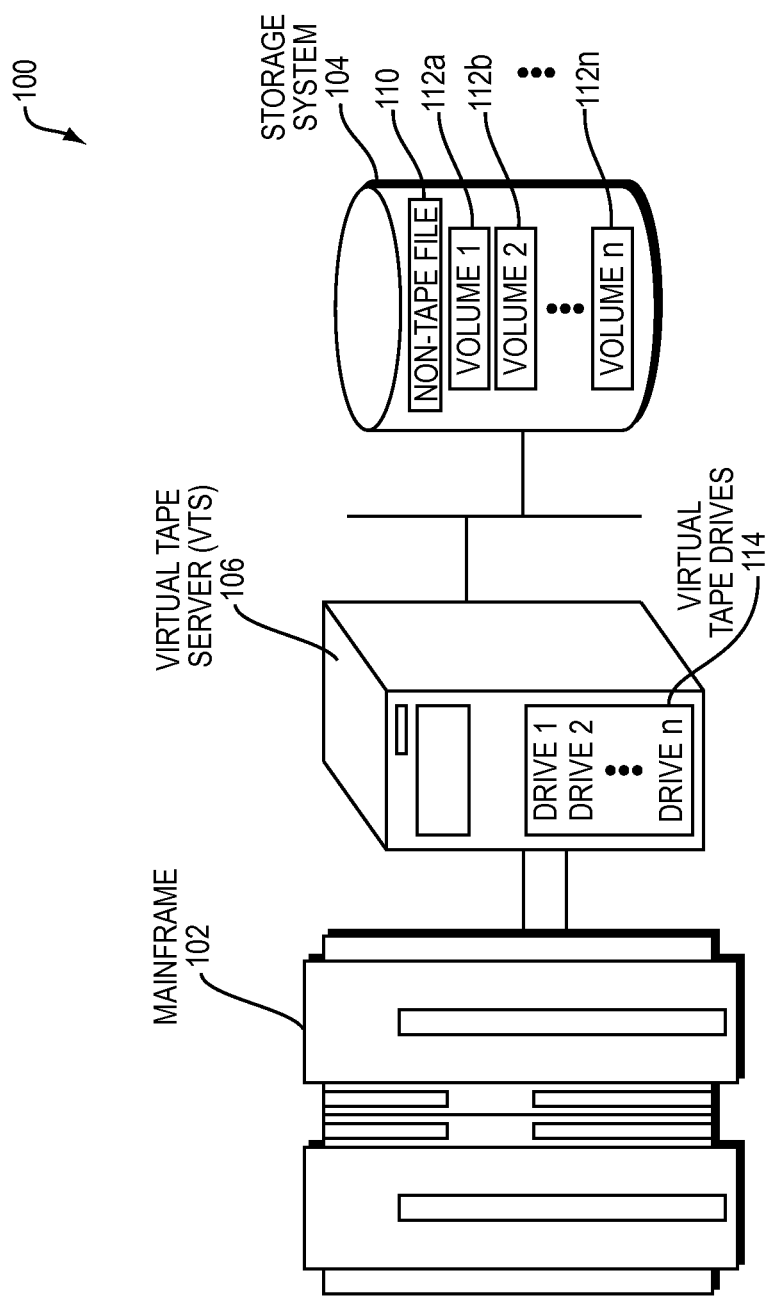
FIG. 1 is a block diagram illustrating an example embodiment employing a mainframe computer operatively coupled with a virtual tape server ("VTS"), which is operatively coupled with a storage system.

A description of example embodiments of the invention follows.

In an embodiment, a method can include sending an I/O request from a mainframe to a virtual tape server. The method can further include reading a non-virtual tape file from the virtual tape server to the mainframe over a virtual tape protocol if the I/O request is a read request. The method can further include writing a non-virtual tape file from the mainframe to the virtual tape server over the virtual tape protocol if the I/O request is a write request.

In an embodiment, the virtual tape protocol can be a Fibre Connection (FICON). The I/O request can include an indication of at least one of a direction of transfer, a file name, a file format, a file length, a file owner, and a file permission.

In an embodiment, the method can include enabling configuration, by a user, of the virtual tape server to enable or disable reading or writing the non-virtual tape file from the virtual tape server.

In an embodiment, reading or writing the non-virtual tape file between the mainframe and the virtual tape server using the virtual tape protocols can be performed over a non-network interface.

In an embodiment, a system can include a request module configured to send an I/O request from a mainframe to a virtual tape server. The system can also include a read module configured to read a non-virtual tape file from the virtual tape server to the mainframe over a virtual tape protocol if the I/O request is a read request. The system can further include a write module configured to, responsive to an input/output (I/O) request from a mainframe, write a non-virtual tape file from the mainframe to the virtual tape server over the virtual tape protocol if the I/O request is a write request.

In an embodiment, a method can include, responsive to an input/output (I/O) request from a mainframe, sending a non-virtual tape file from a virtual tape server to the mainframe over a virtual tape protocol if the I/O request is a read request, and receiving a non-virtual tape file from the mainframe to the virtual tape server over the virtual tape protocol if the I/O request is a write request.

In an embodiment, sending the non-virtual tape file from the virtual tape server can include reading the non-virtual tape file from a non-virtual tape drive on or operatively connected to the virtual tape server.

In an embodiment, receiving the non-virtual tape file from the mainframe can include writing the received non-virtual tape file to a non-virtual tape drive on or operatively connected to the virtual tape server.

In an embodiment, the virtual tape protocol can be a Fibre Connection (FICON). The I/O request can include an indication of at least one of a direction of transfer, a file name, a file format, a file length, a file owner, and a file permission.

In an embodiment, the method can include enabling configuration, by a user, of the virtual tape server to enable or disable reading or writing the non-virtual tape file from the virtual tape server.

In an embodiment, reading or writing the non-virtual tape file between the mainframe and the virtual tape server using the virtual tape protocols can be performed over a non-network interface.

In an embodiment, a system includes a reception module to receive an input/output request from a mainframe. The system can further include a transfer module configured to, responsive to the I/O request from the mainframe, send a non-virtual tape file from a virtual tape server to the mainframe over a virtual tape protocol if the I/O request is a read request, and receive a non-virtual tape file from the mainframe to the virtual tape server over the virtual tape protocol if the I/O request is a write request.

FIG. 1 is a block diagram 100 illustrating an example embodiment employing a mainframe computer 102 operatively coupled with a virtual tape server ("VTS") 106 (e.g., a input/output controller), which is operatively coupled with a storage system 104. The VTS 106 can also be referred to as a 'node,' and the mainframe computer as a 'host.' The Disk Library for mainframe ("DLm"), a product of EMC Corporation of Hopkinton, Mass., is one example of a virtual tape server ("VTS") 106 (e.g., an input/output controller). The mainframe interfaces with the VTS to access virtual tape drives 114, which are presented representations of the data stored in volumes 112a-n of the storage system 104. The storage system 104 can also store non-tape data in a non-tape file 110.

Figure 2:
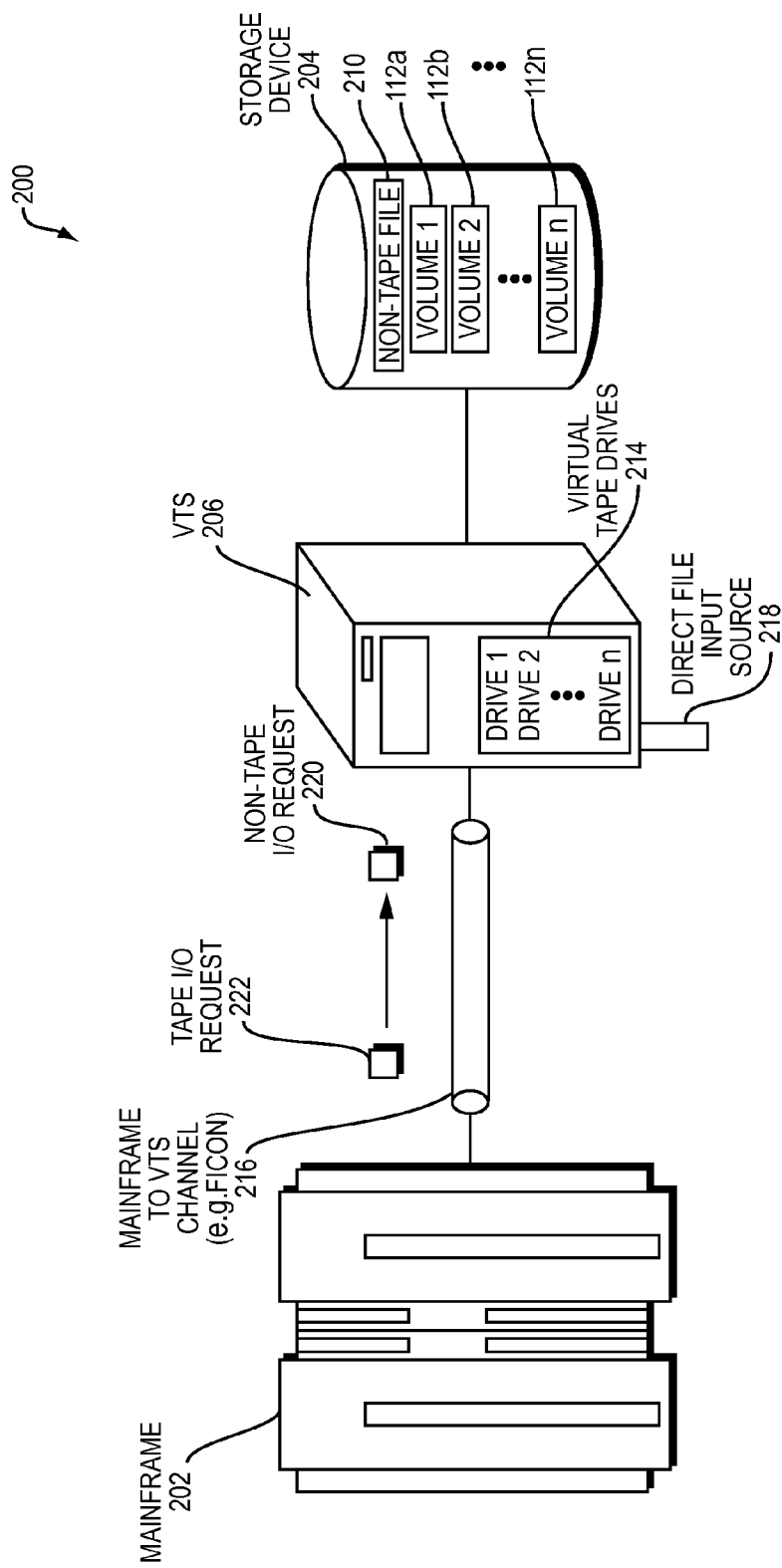
FIG. 2 is a block diagram illustrating an example embodiment of the present invention.

FIG. 2 is a block diagram 200 illustrating an example embodiment of the present invention. A mainframe 202 is operatively coupled with a VTS 206 via a Mainframe to VTS Channel 216 (e.g., FICON). The mainframe 202 can issue a non-tape I/O request 220 and a tape I/O request 222 to the VTS 206 over the Mainframe to VTS channel 216. The VTS 206 can then direct the non-tape I/O request 220 to non-tape file 210 of the storage device 204, and can direct the tape I/O request 22 to volumes 1-n 112a-n of the storage device 204.

Alternatively, in previous systems, loading a file to the non-tape file 210 required connecting to a direct file input source 218, for example, by using a USB drive, to load the required file.

Figure 3:
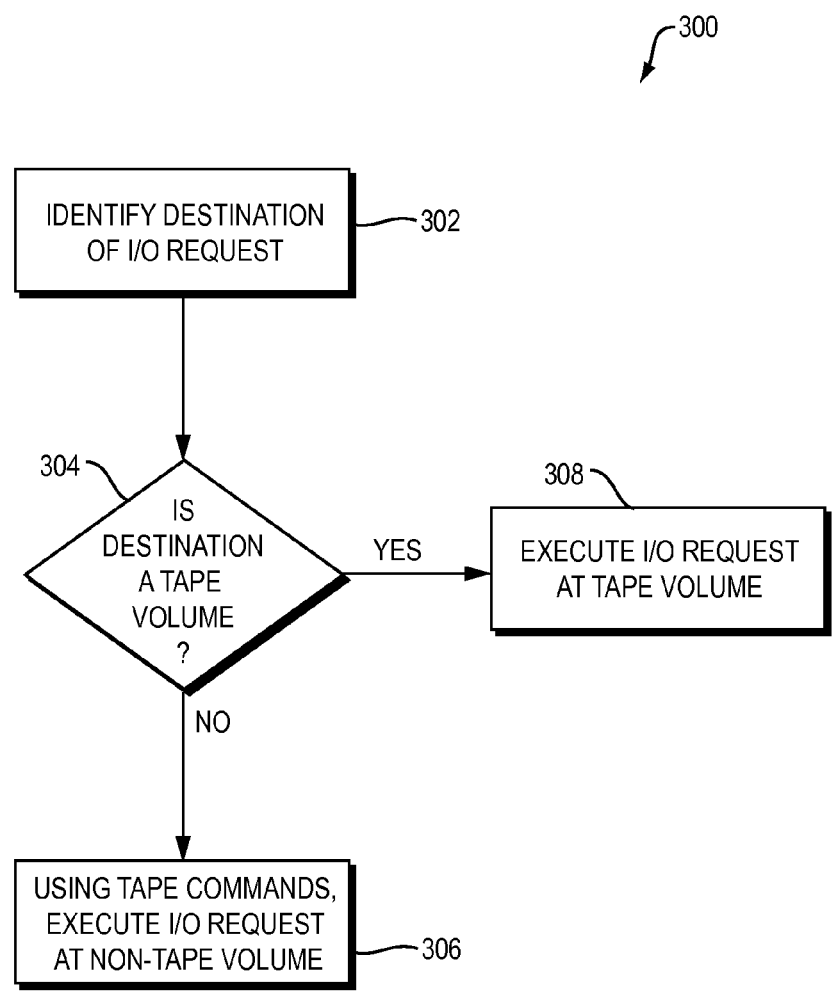
FIG. 3 is a flow diagram illustrating an example embodiment of a process employed by the present invention.

FIG. 3 is a flow diagram 300 illustrating an example embodiment of a process employed by the present invention. The VTS first identifies a destination of the write request sent from the mainframe (302). The VTS then determines if the identified destination of the I/O request is a tape volume or non-tape file (304). If the destination is a tape volume (304), then the system executes the I/O request at the tape volume (308). If the destination is a non-tape file (304), then the VTS executes the I/O request at the non-tape file (306).

Figure 4:
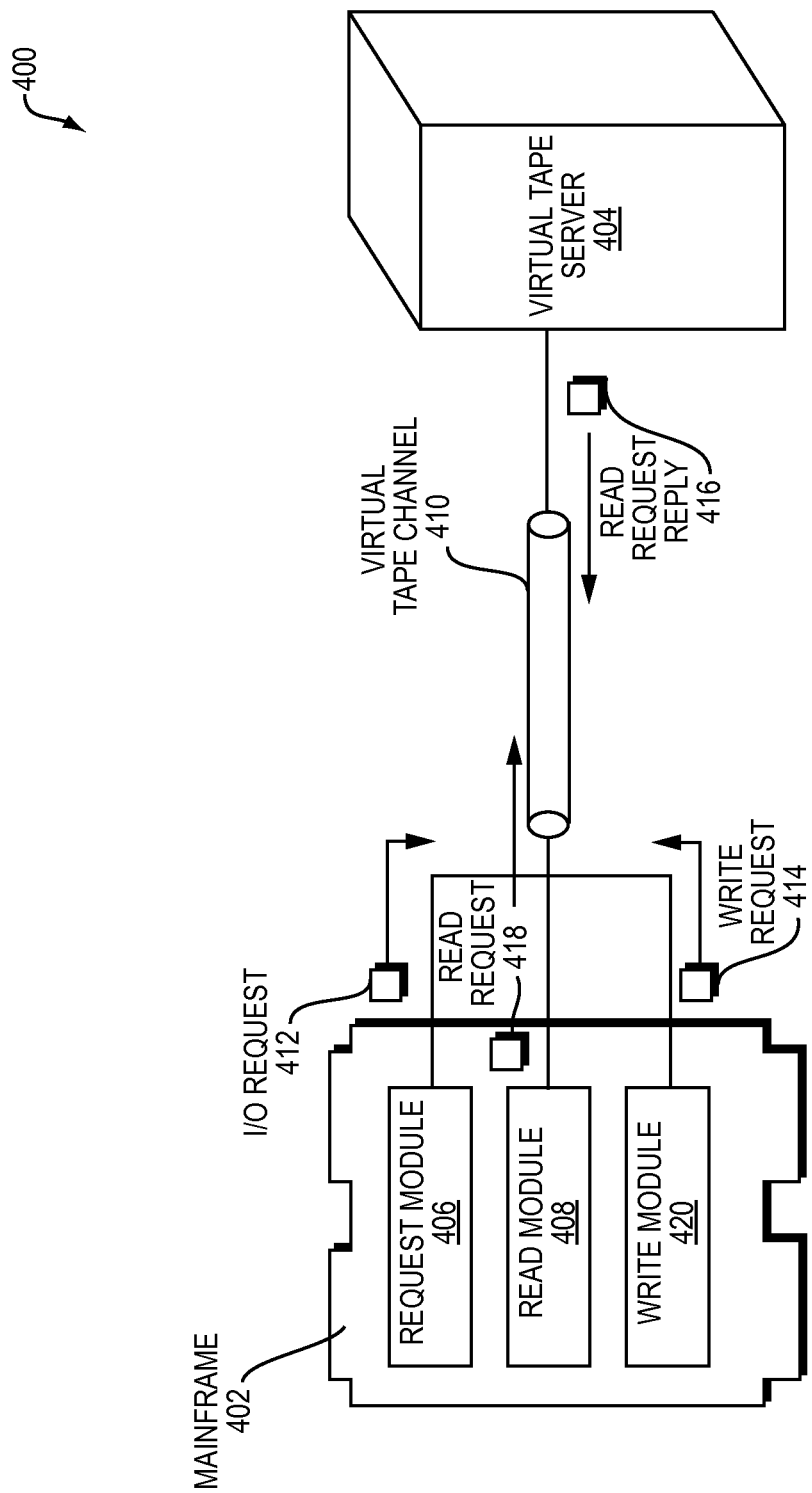
FIG. 4 is a block diagram illustrating an example embodiment of a mainframe operatively coupled to communicate with a virtual tape server 404.

FIG. 4 is a block diagram 400 illustrating an example embodiment of a mainframe 402 operatively coupled to communicate with a virtual tape server 404. The mainframe 402 is operatively coupled to communicate over a virtual tape channel 410 (e.g., FICON). The mainframe includes a request module 406, read module 408 and write module 420.

The request module 406 issues an I/O request 412 over a virtual tape channel 410 to the virtual tape sever 404. The I/O request 412 informs the virtual tape server 404 to be available for a read request 418 or write request 414. The mainframe can then issue the read request 418 from the read module 418 or a write request 414 from the write module 420. If the virtual tape server 404 receives the read request 418, it reads data from a non-virtual tape file and issues a read request reply 416 to the mainframe (e.g., via the read module 408). If the virtual tape server 404 receives a write request 414 from the write module 420 over the virtual tape channel 410, the virtual tape server 404 can write the data in the write request 414 to the non-virtual tape file.

Figure 5:
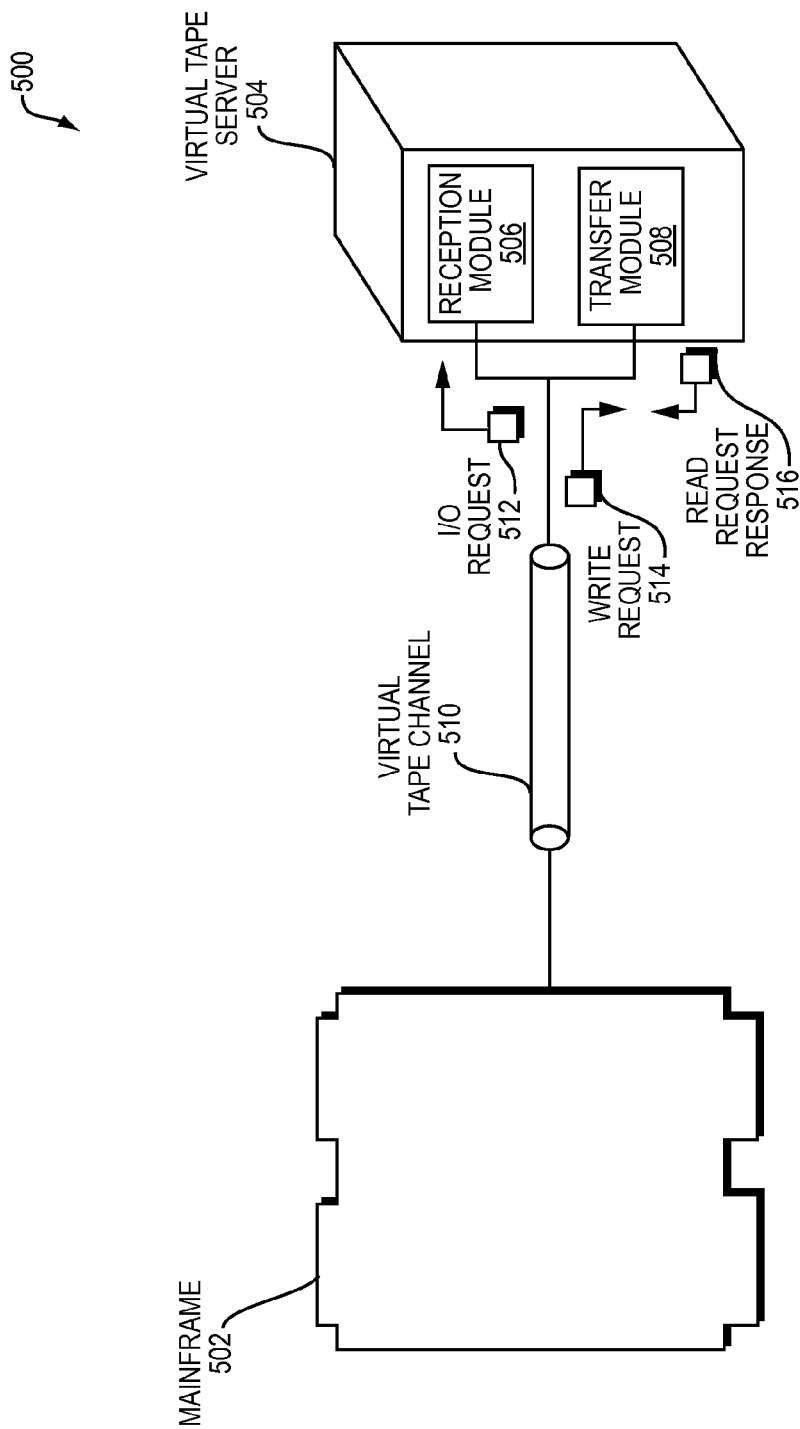
FIG. 5 is a block diagram illustrating an example embodiment of a mainframe operatively coupled to communicate with a virtual tape server 504 over a virtual tape channel.

FIG. 5 is a block diagram 500 illustrating an example embodiment of a mainframe 502 operatively coupled to communicate with a virtual tape server 504 over a virtual tape channel 510. A reception module 506 of the virtual tape server 504 receives an I/O request 512, sent by the mainframe 502 over the virtual tape channel 510. Responsive to receiving the I/O request 512, a transfer module 508 receives data from a write request 514 at a transfer module 508 if the I/O request 512 is a write request. The transfer module 508 then writes the data of the write request 514 to a non-virtual tape file. If the I/O request 512 is a read request, the transfer module 508 reads the requested data from the non-virtual tape file and sends a read request response 516 to the mainframe 502 over the virtual tape channel 510.

An embodiment of the present invention is a method of transferring arbitrary data files between a mainframe host (e.g., mainframe 102 of FIG. 1, mainframe 202 of FIG. 2, mainframe 402 of FIG. 4 and mainframe 502 of FIG. 5) and the VTS (e.g., VTS 106 of FIG. 1, VTS 206 of FIG. 2, VTS 404 of FIG. 4 and VTS 406 of FIG. 5), in one embodiment the DLm, without using virtual tape volumes.

Transferring data between a host and the VTS is performed via virtualized tape volumes. The host writes data to virtual tapes (e.g., virtual tape drives 114 of FIG. 1 and virtual tape drives 214 of FIG. 2) and the host reads data from the virtual tapes. The host acts as if it is dealing with physical tape volumes by issuing physical tape volume commands to the VTS. This illustrates the primary purpose of the VTS: emulating one or more tape drives for use by the host.

The only communication path between the mainframe and the VTS is through the tape device protocol on a Fibre Connection (FICON) channel attachment. The VTS, to the mainframe, looks like a collection of tape drives on which the mainframe can write and read tape data on tape volumes. The mainframe can only read or write tape data to the VTS. Other files (e.g., non-tape file 110 of FIG. 1 and non-tape file 210 of FIG. 2) residing on the VTS platform are inaccessible to the mainframe.

VTS operators can currently move files between personal computers and the VTS platform by networking protocols such as File Transfer Protocol (FTP) or Secure Copy (SCP), or via physical media such as a USB drive directly connected to the platform (e.g., via direct file input source 218 of FIG. 2). A user or administrator typically uses these file transfer methods to load updates, retrieve logs and traces, etc.

While the virtual tape volumes of the VTS store data written by the host to emulate tape drive(s), the VTS stores other files (e.g., non-tape file 110 of FIG. 1 and non-tape file 210 of FIG. 2), such as configuration files, update packages, statistics, traces, logs, and scripts, used to operate and maintain the VTS. Traditional virtual tape protocols do not provide a mechanism to transfer these other files easily because they are not stored in a virtual tape format and because they reside in locations other than in the virtual tape library. Traditionally, transferring these files to and from the VTS employs a method other than virtual tape emulation, such as transferring via a physical, external USB disk or transferring via network with an attached PC (e.g., via direct file input source 218 of FIG. 2). Therefore, there is a need for a VTS system to enable moving files between the host and the VTS (e.g., via Mainframe to VTS Channel 216 of FIG. 2, Virtual Tape Channel 410 of FIG. 4, and Virtual Tape Channel 510 of FIG. 5) without mounting and reading or writing to the virtual tapes of the VTS.

There is currently no existing method to easily transfer arbitrary data files between a mainframe host and the VTS. Using virtual tape protocols to move files between host and VTS requires the data to already be in a specific tape format and to reside in a specific directory on the VTS. Data in other formats or in other directories cannot be accessed by the host.

In response to requests for the ability to perform management of the VTS from the mainframe, an embodiment of the present invention enables a feature allowing the mainframe to directly write files to and read files from the VTS platform regardless of the format of the file/data or location of the file/data on the server. At the same time, mainframes and VTSs often are restricted from being connected through any type of network interface, and for instance, are only connected via FICON. This feature gives the mainframe the capability to transfer any file, using just the FICON channel attachment and using tape-device protocols. The method further allows transfer of any file between a host and the virtual tape server without requiring physical or network access to the server.

Requests for transfers, responses, and the data movement itself are performed with Perform Subsystem Function (PSF) and Read Subsystem Data (RSD) channel command words (CCWs). CCWs are special-purpose commands supported by all tape drives (e.g., 3480/3490/3590). CCWs are typically used by mainframe software to perform diagnostics and set special features on a tape drive.

The unique PSF function codes, along with associated data, are supported to initiate a file transfer to or from the VTS. The PSF function code and its associated data conveys the direction of transfer (e.g., from the VTS or to the VTS), the VTS file name, the file format (binary or text), the record length, the file ownership and permission attributes (for writes), and other file attributes or file transfer settings.

In an embodiment of the present invention, an out-of-band file transfer provides a method to move files between the host and the VTS without the mounting, writing, and reading of virtual tapes. The out-of-band file transfer employs a protocol using a PSF (e.g., non-tape I/O request 220 of FIG. 2, I/O request 412 of FIG. 4 and I/O request 512 of FIG. 5) and a RSD (e.g., read request reply 416 of FIG. 4, and read request response 516 of FIG. 5) tape drive commands. The PSF command and RSD command exist as tape drive commands in VTS systems traditionally. The host can issue the PSF command to define the file being transferred and to transfer the data when writing from host to the VTS. The host can issue the RSD command to transfer data from the VTS to the host (e.g., reading from the VTS). A new program on the host and new functions in the VTS interact to perform the file transfer.

If the VTS rejects the PSF request, the VTS responds to the PSF with a unit-check (UC) status, and returns command-reject (CR) to the subsequent sense CCW.

If the VTS accepts the PSF request, the VTS responds to the PSF with normal channel-end/device-end (CE+DE) status. For a write (e.g., a write from the mainframe to VTS) operation, later PSF CCWs are used to transfer the data to the VTS. VTS writes the data to the file, and returns a normal CE+DE to each PSF if successful, and UC if any error occurs. For a read (e.g., the VTS to the mainframe) operation, later RSD CCWs are used to transfer the data from the VTS. The VTS reads the specific amount of data from the file, and returns it to the mainframe with normal CE+DE status if successful, or it returns a UC if any error occurs. When the VTS returns the last of the data from the file, it returns a unit exception (UX) status along with the data to signal that this is end of file.

The mainframe side of the out-of-band file transfer functionality is built into an application that runs on demand on the mainframe. The mainframe application accepts parameters defining the VTS file specification. The mainframe file specifications are defined on a normal Job Control Language (JCL) Data Definition (DD) statement. The mainframe application sends a PSF command to the VTS to initiate the file transfer, and later PSF or RSD commands to transfer the data.

The file transfer feature can be enabled by adding a parameter to the VTS configuration file. In an embodiment, the file transfer feature is disabled by default, but the setting in the configuration file can enable it.

In an embodiment, a "Query Filetransfer" command displays whether the file transfer feature is enabled, and if so further displays information about the last ten file transfers performed.

In an embodiment, the files transferred can be job data files. A method of transferring job files is described in "Method of Initiating Execution of Mainframe Jobs From a Virtual Tape Server" by Larry W. McCloskey, Karyn M. Kelley, and Sandra J. Goodwin-Jette, co-filed with the present application on the same day, assigned to a common Assignee, and incorporated herein by reference in its entirety.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   sending an I/O request from a mainframe to a virtual tape server; and
   reading data content, stored as a file on the virtual tape server that is not configured in a tape format, from the virtual tape server to the mainframe over a virtual tape protocol if the I/O request is a read request, and writing data content, to be stored as a file on the virtual tape server that is configured in a tape format, from the mainframe to the virtual tape server over the virtual tape protocol if the I/O request is a write request.

2. The method of claim 1, wherein the virtual tape protocol is a Fibre Connection (FICON).

3. The method of claim 1, wherein the I/O request includes an indication of at least one of a direction of transfer, a file name, a file format, a file length, a file owner, and a file permission.

4. The method of claim 1, further comprising enabling configuration, by a user, of the virtual tape server to enable or disable reading or writing the data content from the virtual tape server.

5. The method of claim 1, wherein reading or writing the data content between the mainframe and the virtual tape server using the virtual tape protocols is performed over a non-network interface.

6. A system comprising:
   a request module configured to send an I/O request from a mainframe to a virtual tape server; and
   a read module configured to read data content, stored as a file on the virtual tape server that is not configured in a tape format, from the virtual tape server to the mainframe over a virtual tape protocol if the I/O request is a read request; and
   a write module configured to write data content, to be stored as a file on the virtual tape server that is not configured in a tape format, from the mainframe to the virtual tape server over the virtual tape protocol if the I/O request is a write request.

7. The system of claim 6, wherein the virtual tape protocol is a Fibre Connection (FICON).

8. The system of claim 6, wherein the I/O request includes an indication of at least one of a direction of transfer, a file name, a file format, a file length, a file owner, and a file permission.

9. The system of claim 6, further comprising a user interface module configured to enable configuration, by a user, of the virtual tape server to enable or disable reading or writing the data content from the virtual tape server.

10. The system of claim 6, wherein read module and write module are configured to read the data content from or write the non-virtual tape data to, respectively, the virtual tape server using the virtual tape protocols over a non-network interface.

11. A method comprising:
    responsive to an input/output (I/O) request from a mainframe, sending data content, stored as a file on the virtual tape server that is not configured in a tape format, from a virtual tape server to the mainframe over a virtual tape protocol if the I/O request is a read request, and receiving data content, to be stored as a file on the virtual tape server that is not configured in a tape format, from the mainframe to the virtual tape server over the virtual tape protocol if the I/O request is a write request.

12. The method of claim 11, wherein sending the data content from the virtual tape server further includes reading the data content from a non-virtual tape drive on or operatively connected to the virtual tape server.

13. The method of claim 11, wherein receiving the data content from the mainframe further includes writing the received data content to a non-virtual tape drive on or operatively connected to the virtual tape server.

14. The method of claim 11, wherein the virtual tape protocol is a Fibre Connection (FICON).

15. The method of claim 11, wherein the I/O request includes an indication of at least one of a direction of transfer, a file name, a file format, a file length, a file owner, and a file permission.

16. The method of claim 11, further comprising enabling configuration, by a user, of the virtual tape server to enable or disable reading or writing the data content from the virtual tape server.

17. The method of claim 11, wherein reading or writing the data content between the mainframe and the virtual tape server using the virtual tape protocols is performed over a non-network interface.

18. A system comprising:
a reception module to receive an input/output request from a mainframe; and
a transfer module configured to, responsive to the I/O request from the mainframe, send data content, stored as a file on the virtual tape server that is not configured in a tape format, from a virtual tape server to the mainframe over a virtual tape protocol if the I/O request is a read request, and receive data content, to be stored as a file on the virtual tape server that is not configured in a tape format, from the mainframe to the virtual tape server over the virtual tape protocol if the I/O request is a write request.

19. The system of claim 18, wherein the transfer module is further configured to send the data content from the virtual tape server by reading the data content from a non-virtual tape drive on or operatively connected to the virtual tape server.

20. The system of claim 18, wherein the transfer module is further configured to receive the data content from the mainframe by writing the received data content to a non-virtual tape drive on or operatively connected to the virtual tape server.

21. The system of claim 18, wherein the virtual tape protocol is a Fibre Connection (FICON).

22. The system of claim 18, wherein the I/O request includes an indication of at least one of a direction of transfer, a file name, a file format, a file length, a file owner, and a file permission.

23. The system of claim 18, further comprising enabling configuration, by a user, of the virtual tape server to enable or disable reading or writing the data content from the virtual tape server.

24. The system of claim 18, wherein reading or writing the data content between the mainframe and the virtual tape server using the virtual tape protocols is performed over a non-network interface.

* * * * *